United States Patent
Kunieda

(10) Patent No.: US 9,228,153 B2
(45) Date of Patent: Jan. 5, 2016

(54) SURFACE-TREATING AGENT FOR OIL SEAL LIP PORTION

(75) Inventor: Kenichi Kunieda, Kanagawa (JP)

(73) Assignee: NOK Corporation, Tokyo (JP)

( * ) Notice: Subject to any disclaimer, the term of this patent is extended or adjusted under 35 U.S.C. 154(b) by 26 days.

(21) Appl. No.: 14/124,083

(22) PCT Filed: Jun. 14, 2012

(86) PCT No.: PCT/IB2012/001143
§ 371 (c)(1),
(2), (4) Date: Dec. 5, 2013

(87) PCT Pub. No.: WO2012/176033
PCT Pub. Date: Dec. 27, 2013

(65) Prior Publication Data
US 2014/0106995 A1 Apr. 17, 2014

(30) Foreign Application Priority Data
Jun. 20, 2011 (EP) .................................. 11170504

(51) Int. Cl.
| | | |
|---|---|---|
| C10M 169/04 | (2006.01) | |
| C10M 169/06 | (2006.01) | |
| A01N 47/48 | (2006.01) | |
| C08G 18/32 | (2006.01) | |
| C08G 18/76 | (2006.01) | |
| C09D 175/04 | (2006.01) | |
| F16J 15/32 | (2006.01) | |
| C08G 18/80 | (2006.01) | |
| C09D 127/18 | (2006.01) | |
| C09D 7/12 | (2006.01) | |
| C08J 7/04 | (2006.01) | |
| C08L 27/18 | (2006.01) | |
| C08L 75/04 | (2006.01) | |
| C08K 3/04 | (2006.01) | |
| C08K 3/30 | (2006.01) | |

(52) U.S. Cl.
CPC ....... C10M 169/044 (2013.01); C08G 18/3206 (2013.01); C08G 18/7621 (2013.01); C08G 18/8022 (2013.01); C08J 7/047 (2013.01); C09D 7/125 (2013.01); C09D 7/1216 (2013.01); C09D 127/18 (2013.01); C09D 175/04 (2013.01); F16J 15/324 (2013.01); F16J 15/3284 (2013.01); C08J 2321/00 (2013.01); C08J 2327/12 (2013.01); C08K 3/04 (2013.01); C08K 2003/3009 (2013.01); C08L 27/18 (2013.01); C08L 75/04 (2013.01)

(58) Field of Classification Search
CPC ................. C10M 2201/041; C10M 2201/066; C10M 2219/06
USPC ........................................ 508/128, 168, 386
See application file for complete search history.

(56) References Cited

U.S. PATENT DOCUMENTS

| | | | |
|---|---|---|---|
| 3,511,685 A | 5/1970 | Rentschler | |
| 3,597,273 A | 8/1971 | Akashi et al. | |
| 3,740,246 A | 6/1973 | Kuga et al. | |
| 4,269,931 A | 5/1981 | Suzuki et al. | |
| 6,175,712 B1 | 1/2001 | Masuda et al. | |
| 2009/0200750 A1* | 8/2009 | Takeno et al. ................. | 277/569 |

FOREIGN PATENT DOCUMENTS

| | | |
|---|---|---|
| EP | 0 537 360 A1 | 4/1993 |
| EP | 0 562 191 A2 | 9/1993 |
| EP | 1 895 208 A1 | 3/2008 |
| EP | 2 135 903 A1 | 12/2009 |
| JP | 2003-213122 | 7/2003 |

OTHER PUBLICATIONS

International Search Report from corresponding PCT application No. PCT/IB2012/001143 dated Sep. 14, 2012 (3 pgs).
International Preliminary Report on Patentability and Written Opinion from corresponding PCT application No. PCT IB2012/001143 dated Dec. 23, 2013 (7 pgs).

* cited by examiner

*Primary Examiner* — Vishal Vasisth
(74) *Attorney, Agent, or Firm* — Brinks Gilson & Lione

(57) ABSTRACT

Disclosed is a surface-treating agent for oil seal lip portion, comprising a lubricant filler and an adduct compound consisting of an adduct of toluene diisocyanate and trimethylolpropane, the surface-treating agent being applied to the surface of vulcanized rubber forming a lip portion of an oil seal comprising the lip portion and a metal ring. The application of the surface-treating agent of the present invention to the sliding surface of a seal lip portion of an oil seal effectively lengthens the service life of the oil seal, when used in a sliding part or a moving part, and leads to energy saving of equipment that uses the oil seal.

4 Claims, No Drawings

SURFACE-TREATING AGENT FOR OIL SEAL LIP PORTION

RELATED APPLICATION

This application is a 35 U.S.C. §371 national phase filing of International Patent Application No. PCT/IB2012/001143, filed Jun. 14, 2012, through which and to which priority is claimed under 35 U.S.C. §119 to European Patent Application No. 11170504.2, filed Jun. 20, 2011.

TECHNICAL FIELD

The present invention relates to a surface-treating agent for oil seal lip portion. More particularly, the present invention relates to a surface-treating agent for oil seal lip portion that is applied to the surface of vulcanized rubber forming a lip portion of an oil seal comprising the lip portion and a metal ring.

BACKGROUND ART

Oil seals are widely used as important machine components in the fields of automobile, industrial machine, etc. Oil seals are used for the purpose of movement or sliding; however, deterioration of seal oil and sealing materials caused by the frictional heat of the seals, and energy loss in the device due to frictional resistance cause problems in many cases.

The friction of oil seals can be reduced by forming a coating film of a material, whose friction coefficient is lower than that of the sealing material, on the sliding surface of the oil seal lip portion; however, the low friction effect is lost when the coating film is removed by sliding.

The present applicant has previously proposed a surface-treating agent for vulcanized rubber, the surface-treating agent being prepared as an organic solvent solution by mixing wax having a softening point of 40 to 160° C. and fluororesin each in an amount of 10 to 160 parts by weight with 100 parts by weight of isocyanate group-containing 1,2-polybutadiene. This surface-treating agent for vulcanized rubber is effectively applied to oil seals etc. (see Patent Document 1).

PRIOR ART DOCUMENT

Patent Document

Patent Document 1: JP-B-3893985

OUTLINE OF THE INVENTION

Problem to be Solved by the Invention

An object of the present invention is to provide a surface-treating agent for oil seal lip portion that is applied to the surface of vulcanized rubber forming a lip portion of an oil seal comprising the lip portion and a metal ring, and thereby the application of the surface-treating agent to the sliding surface of the seal lip portion efficiently lengthens the service life of the oil seal, when used in a sliding part or moving part, and leads to energy saving of equipment that uses the oil seal.

Means for Solving the Problem

The above object of the present invention can be accomplished by a surface-treating agent for oil seal lip portion, comprising a lubricant filler and an adduct compound consisting of an adduct of toluene diisocyanate and trimethylolpropane, the surface-treating agent being applied to the surface of vulcanized rubber forming a lip portion of an oil seal comprising the lip portion and a metal ring.

Effect of the Invention

The surface-treating agent for oil seal lip portion according to the present invention is applied to the surface of vulcanized rubber that forms an oil seal lip portion. Since the adduct of toluene diisocyanate and trimethylolpropane, which is an essential component of the surface-treating agent, has free isocyanate groups, the adduct has excellent adhesion to vulcanized rubber, i.e., a sealing material, and thus acts as a binding agent with a base material. Moreover, the surface-treating agent has high hardness after curing, and thus has excellent abrasion resistance. Furthermore, a coating film obtained by curing the surface-treating agent contains a lubricant filler, and thus has an improved abrasion resistance, lubricity, and creep resistance.

The application of the surface-treating agent of the present invention, which has such properties, to the sliding surface of a seal lip portion of an oil seal effectively lengthens the service life of the oil seal, when used in a sliding part or a moving part, and leads to energy saving of equipment that uses the oil seal.

EMBODIMENTS FOR CARRYING OUT THE INVENTION

Examples of oil seals to which the surface-treating agent of the present invention is applied to a lip-seal portion include standard oil seals such as spring-embedded, bonded-rubber seal, spring-embedded, metal-cased seal, springless, bonded-rubber seal, springless, metal-cased seal, spring-embedded, bonded-rubber seal with duster lip, and spring-embedded, metal-cased seal with duster lip; and special oil seals such as reciprocating seal, mud-resistant seal, pressure-resistant seal, bidirectional seal, and assembly seal with sleeve.

Alternatively, depending on the shape of the lip portion of oil seal lip portion, the surface-treating agent of the present invention can also be effectively applied to oil seals, such as single lip oil seals, single lip (spring-embedded) oil seals, double lip oil seals, and dual lip oil seals; and oil seals having specific lip seals, such as split seal, external seal, and hydrodynamic seal.

The lip portion of such an oil seal is made of vulcanized rubber. Examples of rubber for forming the lip portion include fluororubber, acrylic rubber, nitrile rubber, hydrogenated nitrile rubber, silicone rubber, etc.; preferably, fluororubber or acrylic rubber is used. Peroxide-crosslinking type fluororubber and polyol-crosslinking type fluororubber both can be used. Examples of acrylic rubber include those using various crosslinkable groups, such as carboxyl group and chlorine group. For their vulcanization, vulcanizing agents depending on the type of crosslinkable group used are used.

The surface-treating agent for oil seal lip portion, comprising a lubricant filler and an adduct compound consisting of an adduct of toluene diisocyanate and trimethylolpropane as essential components is applied to the surface of a lip portion made of vulcanized rubber, particularly to the surface of a lip-seal portion.

An adduct as an addition-reaction product of 1 mol of trimethylolpropane and 3 mol of toluene diisocyanate [TDI] may be a commercial product, such as Desmodur L75 (manufactured by Sumika Bayer Urethane), which has the following properties:

NCO content: 13.3±0.4%
Non-volatile content: 75±2%

Viscosity (23° C.): 1600±400 mPa·s
Iodine color value: ≤2
Free TDI content (based on solid): <0.5%
Equivalent weight: approx. 315
Flash point: approx. 5° C.
Density (20° C.): approx. 1.17 g/ml
Solubility: good compatibility with esters, such as ethyl acetate, butyl acetate, and 1-methoxypropylacetate-2; and aromatic hydrocarbons, such as toluene and xylene Examples of the lubricant filler, which is the other component of the surface-treating agent, include fluororesin powder typified by PTFE resin powder, graphite, molybdenum disulfide, silicon carbide, etc.; preferably, PTFE resin powder, graphite, or molybdenum disulfide is used.

These essential components can be used in any proportion. For example, the lubricant filler is generally used at a ratio of about 90 to 15 wt. %, preferably about 85 to 40 wt. %, with respect to about 10 to 85 wt. %, preferably about 15 to 60 wt. % of toluene diisocyanate/trimethylolpropane adduct.

The surface-treating agent is applied as a dispersed coating liquid to the surface of vulcanized rubber forming a lip portion. The dispersed coating liquid is prepared by, for example, dispersing the surface-treating agent in 25 wt. % of ethyl acetate contained in Desmodur L75, as described above, or further diluting the dispersion with various esters or aromatic hydrocarbons to a solids content of about 1 to 15 wt. %. Alcohols cannot be used as dilute organic solvents because they react with Desmodur L75.

The surface-treating agent can be applied to the surface of vulcanized rubber by any method, such as immersing, spraying, roll coater, or flow coater. After coating, depending on the type of rubber forming a vulcanized rubber layer, heat treatment is performed under heating conditions that sufficiently ensure curing and adhesion of the coating film, that is, at a temperature of about 150 to 270° C., preferably about 175 to 270° C., for about 5 minutes to about 24 hours.

The coating thickness of the surface-treating agent layer after heat-treatment is generally set to about 3 to 30 μm, preferably about 5 to 20 μm. When the coating thickness is less than this range, the entire surface of the vulcanized rubber cannot be covered, and a desired low friction coefficient cannot be achieved. Conversely, when the coating thickness is larger than this range, the rigidity of the surface of the coating film becomes higher, impairing sealing properties and flexibility. The adjustment of the hardness of the coating film surface can be achieved by mixing various hydroxyl group-containing resins in the surface-treating agent.

EXAMPLES

The following describes the present invention with reference to Examples.

Example 1

A surface-treating agent comprising 15 wt. % of tolylene diisocyanate-trimethylolpropane adduct (Desmodur L75, manufactured by Sumika Bayer Urethane; TDI adduct, about 75 wt. % ethyl acetate solution) and 85 wt. % of PTFE powder (average particle size: 1 μm) was applied to the surface of vulcanized fluororubber forming a lip portion of an oil seal comprising the lip portion and a metal ring. The friction coefficient was measured by the following method.

Oil seal friction coefficient measurement test:
The surface-treating agent was applied to the surface of vulcanized rubber forming a lip portion of an oil seal (inner diameter: 85 mm, outer diameter: 105 mm, width: 13 mm) to a thickness of 10 μm, followed by heat treatment at 200° C. for 30 minutes. Thereafter, a lubricating oil (Motor Oil SM 0W-30, manufactured by Toyota) was tightly sealed, and under conditions in which the heating test temperature was 100° C. and the number of rotations was 2,000 rpm, the frictional force and tension force of the seal were measured one hour later after the beginning of the test to calculate the friction coefficient. The product friction coefficient was evaluated as follows: 0.34 or less: ⊚, 0.35 to 0.44: ○, 0.45 to 0.54: Δ, and 0.55 or more: X. (Low friction effects are obviously shown at ⊚ or ○.)

Examples 2 to 6

In Example 1, the amount of TDI adduct and the kind and amount of lubricant filler were changed in various ways. The graphite used was Graphite HPO manufactured by Nippon Graphite Industries, and the molybdenum disulfide used was LM-13 manufactured by Daito Lubricating Corporation.

Example 7

In Example 2, the friction coefficient of an oil seal comprising a lip portion made of vulcanized acrylic rubber was measured.

Comparative Example 1

In Example 1, the lip portion was not subjected to a surface treatment with the surface-treating agent.

Comparative Example 2

In Example 7, the lip portion was not subjected to a surface treatment with the surface-treating agent.

Comparative Example 3

In Example 2, the surface treatment with the surface-treating agent was performed using tolylene diisocyanate [TDI] in place of the TDI adduct in the same amount.

The following table shows the measurement results obtained in Examples and Comparative Examples. The amount of each component is represented by solid matter wt. %.

TABLE

| Example | Surface-treating agent | | | | | Measurement result | |
| --- | --- | --- | --- | --- | --- | --- | --- |
| | TDI adduct | TDI | PTFE | Graphite | MoS$_2$ | Friction coefficient | Evaluation |
| Ex. 1 | 15 | — | 85 | — | — | 0.43 | ○ |
| Ex. 2 | 40 | — | 60 | — | — | 0.32 | ⊚ |
| Ex. 3 | 60 | — | 40 | — | — | 0.33 | ⊚ |
| Ex. 4 | 85 | — | 15 | — | — | 0.43 | ○ |
| Ex. 5 | 40 | — | — | 60 | — | 0.35 | ○ |
| Ex. 6 | 40 | — | — | — | 60 | 0.35 | ○ |
| Ex. 7 | 40 | — | 60 | — | — | 0.44 | ○ |
| Comp. Ex. 1 | — | — | — | — | — | 0.55 | X |
| Comp. Ex. 2 | — | — | — | — | — | 0.57 | X |
| Comp. Ex. 3 | — | 40 | 60 | — | — | 0.49 | Δ |

The invention claimed is:
1. A method of surface-treating an oil seal lip portion of an oil seal comprising the lip portion and a metal ring, the method comprising providing a surface treating agent comprising a lubricant filler and an adduct compound consisting of an adduct of toluene diisocyanate and trimethylolpropane; and applying the surface-treating agent a surface of vulcanized fluororubber or vulcanized acrylic rubber forming a lip portion of an oil seal comprising the lip portion and a metal ring.

2. The method according to claim 1, wherein the lubricant filler is a fluororesin powder, graphite, or molybdenum disulfide.

3. An oil seal comprising a lip portion made of vulcanized rubber and a metal ring, the surface of the lip portion being subjected to surface treatment method according to claim 1.

4. An oil seal comprising a lip portion made of vulcanized rubber, the surface of the lip portion being subjected to the surface treatment method according to claim 2.

* * * * *